May 9, 1967 P. THEVIS 3,318,519

APPARATUS FOR TRANSFERRING VALUES BETWEEN THE REGISTERS OF A CALCULATOR

Filed April 20, 1965 3 Sheets-Sheet 1

INVENTOR
BY: Paul Thevis
ATTORNEY
Michael J Striker

May 9, 1967 P. THEVIS 3,318,519

APPARATUS FOR TRANSFERRING VALUES BETWEEN THE REGISTERS OF A CALCULATOR

Filed April 20, 1965

3 Sheets-Sheet 2

INVENTOR
BY: Paul Thevis
ATTORNEY
Michael J. Striker

INVENTOR
BY: Paul Thevis
ATTORNEY
Michael J. Striker

United States Patent Office 3,318,519

Patented May 9, 1967

3,318,519

APPARATUS FOR TRANSFERRING VALUES BETWEEN THE REGISTERS OF A CALCULATOR

Paul Thevis, Oberndorf (Neckar), Germany, assignor to Olympia Werke AG., Wilhelmshaven, Germany Filed Apr. 20, 1965, Ser. No. 449,436

Claims priority, application Germany, Apr. 20, 1964, O 10,093

19 Claims. (Cl. 235—60)

ABSTRACT OF THE DISCLOSURE

The present invention relates to an apparatus for transferring values between the registers of a calculator, and more particularly to apparatus for transferring values between counter registers used for addition or subtraction, and a multiplication register in accordance with the position of the input storage means, for example, depending on whether a value is stored in a pin carriage, or whether the pin carriage is in the home position due to the fact that no new value was entered into the same.

It is known to transfer numerical values between the registers of a multiplying calculator. One calculator according to the prior art is capable of selectively transferring values between counter registers, intermediate storage registers and printing registers. Such a calculator includes a pin carriage which moves out of a home position when a value is entered, and moves one step further for each additional order of the entered numerical value. The calculator of the prior art also includes transfer means driven by the operating means of the machine to sense the value entered into the pin carriage, and to transfer the same to a register. Such operations are started by the actuation of function keys which place counter registers, or multiplication registers in positions cooperating with the transfer means, and simultaneously start the operating means to cause the transfer of a value from an intermediate storage register into the multiplication register, for example.

In a known calculator of this type, a control lever is provided on the keyboard by which the operator can set the calculator to different operations, for example "calculating without printing," "printing without calculating," "printing with calculating" or "printing of a date." The control member causes movement of the respective registers between inoperative and operative positions cooperating with the transfer means. For example, if the subtotal key, and then one of the function keys associated with a particular register are actuated, a value transferred from a counter register into a calculating register can be transferred to another selected register. In this manner, it is possible to exchange the values stored in different registers without requiring another actuation of the keys of the calculator.

This known calculator has certain disadvantages. First, an additional control member has to be added to the standard keyboard, so that the operator has to become acquainted with the additional functions of the control member, and consequently will hesitate to use a machine which has a keyboard of unusual appearance. Secondly, the control lever may be accidently left in a wrong position, or may not operate properly after a prolonged use, which will cause undesired transfers and wrong results. Finally, the control member is arranged in the region of the keyboard in such a manner that it can be accidentally touched and operated during actuation of the keys of the keyboard, and thus set the calculator to an entirely unintended operation.

Another known calculator provides instead of a control member, additional function keys which cause transfers between counter registers and multiplication registers. This construction has a disadvantage that the number of keys of the keyboard is increased, and that the keyboard is not the standard keyboard to which the operator is accustomed.

It is one object of the invention to overcome the disadvantages of known calculators for transferred values between registers, and to provide an apparatus of simple construction, using the standard keyboard, and being nevertheless capable of transferring values between different registers of a calculator.

Another object of the invention is to provide an apparatus for transferring values between addition, subtraction, storing, and printing registers and a multiplication register in which the transfer operations are not caused by manually operated means added to a standard keyboard.

Another object of the invention is to use the function keys of a standard keyboard of a calculator for initiating transfer operations between registers, such as addition and subtraction registers and multiplication registers.

Another object of the invention is to use a single function key, for example the multiplication key, for causing different operations depending on whether a value is entered into the input storage means.

Another object of the invention is to provide a calculator which, upon operation of the multiplication key causes transfer of a numerical value from the input storage means to a multiplication register, but causes transfer of a numerical value between the multiplication register and another register if no value was previously entered into the input storage means.

Another object of the invention is to provide a calculator which upon operation of the multiplication key and a total key, causes the transfer of a total or subtotal from a register into the multiplication register.

Another object of the invention is to provide a calculator in which a numerical value can be transferred from the multiplication register to a printing register by operation of the multiplication key and non-addition key.

Another object of the invention is to transfer a value stored in a multiplication register to another register by operation of standard function keys, and without the use of other keys of the keyboard.

With these objects in view, the present invention is concerned with the transfer of values between the registers of a calculator which may have a standard keyboard. One embodiment of the invention is applied to a ten-key calculator, and comprises input storage means, such as a pin carriage, movable between a home position and at least one storing position; sensing means for sensing the position of the pin carriage and assuming a particular position if the pin carriage is in the home position indicating that no value was entered into the pin carriage; transfer means operable in the usual manner for sensing the pins of the pin carriage and thereby numbers stored in the same; register means which may comprise a multiplication register and another register; function key means, such as the multiplication key and an addition key, for starting the operating means of the calculator; and connecting means operable by the function key means for connecting the operating means with the register means in such a manner that the operating means move at least the multiplication register to and from a transfer position cooperating with the transfer means so that numbers can be transferred between the same and the register means. In accordance with the invention, the connecting means include means controlled by the sensing means to prevent the starting of the operating means by the function key means, particularly the multiplication key, when the pin carriage is in the home position.

A preferred embodiment of the invention comprises addition and subtraction registers which can be caused by addition and subtraction keys to move to a transfer position connected with the transfer means for the transfer of numbers, and a multiplication key which normally performs the same function with a multiplication register. The start of the operating means by the multiplication key is accomplished by the closing of a switch by connecting means controlled by the sensing means and operable by the multiplication key. The connecting means includes coupling means which operate in such a manner that the starting switch of the operating means is closed by the multiplication key only if the pin carriage is in a storing position indicating the entry of a value into the pin carriage. If the pin carriage is in the home position, and no value entered into the same, the operating means are started by actuation of another function key, for example the addition key, and a transfer of values between the multiplication register and the addition register, for example, takes place.

The connecting means include a first coupling device including first and second coupling means movable from a disengaged position to coupling positions for coupling the operating means with the multiplication register for moving the same to and from a transfer position cooperating with the transfer means. The first coupling means in the coupling position thereof actuates the starting switch of the operating means. A second coupling device has first and second coupling positions for coupling the multiplication key with the first and second coupling means, respectively for movement of the same by the multiplication key to the respective coupling positions. Consequently, the first coupling means actuates the starting switch of the operating means when the multiplication key is operated in the first coupling position of the second coupling device. The second coupling device is settable for movement to the first or second coupling position by the sensing means. The first coupling position is assumed when the input carriage is in a storing position and the second coupling position is assumed under the control of the sensing means when the pin carriage is in the home position. In this manner, the start of transfer operations between the multiplication register and the other registers is possible only if the pin carriage is in the home position and no numerical value was entered into the pin carriage. If a numerical value was entered into the pin carriage, the starting switch of the operating means is closed under control of the multiplication key, and the value is transferred from the pin carriage into the multiplication register.

The apparatus of the invention permits a function key to perform two different functions, depending on the position of the input storage means, for example of the pin carriage of a ten key calculator. When a numerical value is entered into the pin carriage by operation of digit keys, the input carriage moves stepwise for a number of steps corresponding to the number of orders of the respective entered number. If the function key, for example the multiplication key, is then operated, the same operation is performed as in conventional calculators, namely the multiplication register is connected with the transfer means, whereupon a machine operation is started which results in the transfer of the numerical value from the pin carriage into the multiplication register. However, if the pin carriage remains in the home position because no value was entered, the operation of the function key does not start a machine operation, but connects the multiplication register with the transfer means. If another function key, for example the addition key, is actuated, the machine operation is started by the same after the respective register, for example the addition register, has been connected with the transfer means. The thus started machine operation causes a transfer of a value stored in the multiplication register into the respective other register, for example into the addition register. In this manner, values can be transferred between registers using only the standard keys of the keyboard. No transfer of a value from the pin carriage can take place, since the same does not store any numerical value if a transfer between registers is intended.

In accordance with the invention, the total key, and the subtotal key are operatively connected with the abovementioned second coupling device for shifting the same from the second coupling position to the first coupling position. In this manner, the effect of the sensing means sensing the position of the pin carriage is overruled, and a total or subtotal can be transferred from a register into the multiplication register.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
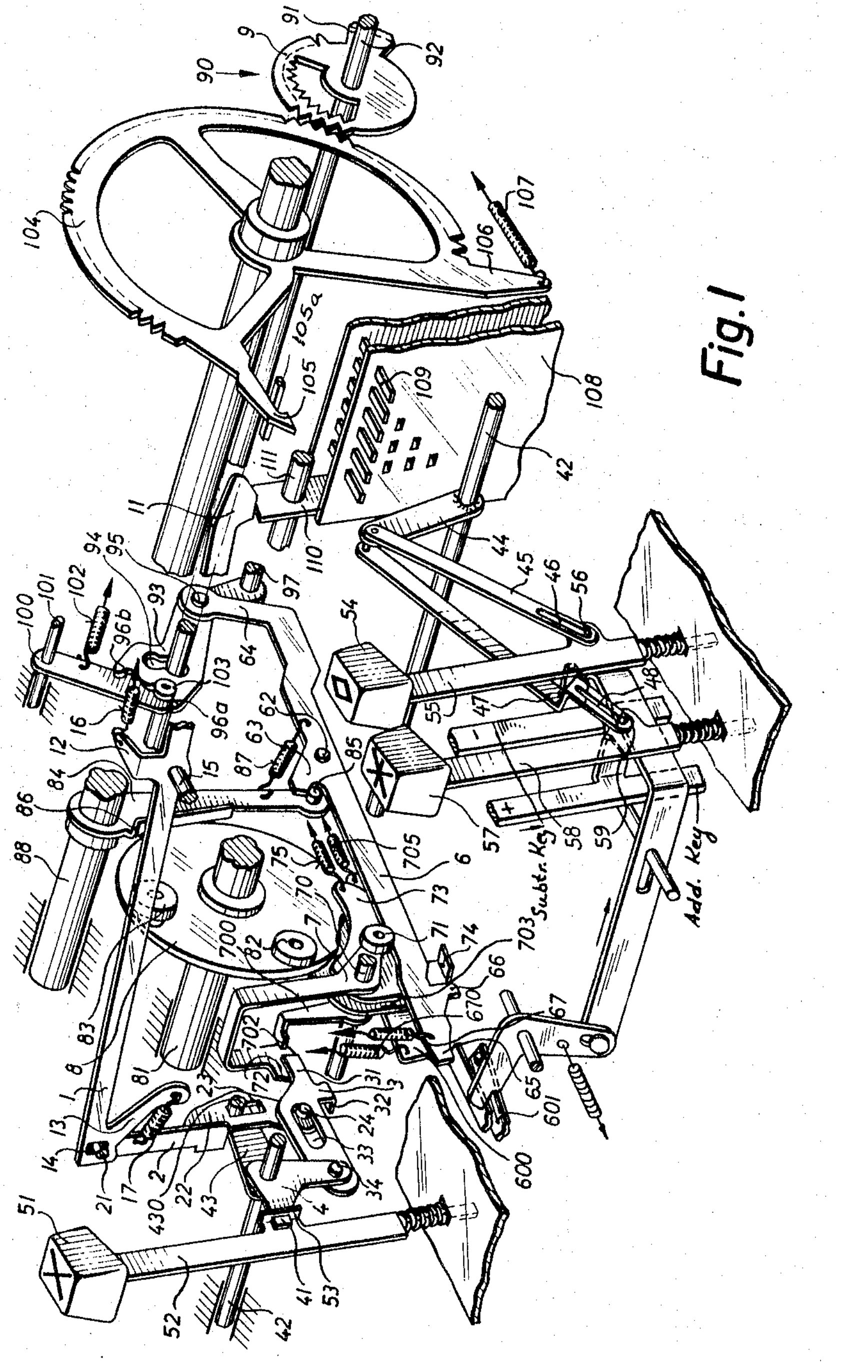
FIG. 1 is a fragmentary perspective view illustrating one embodiment of the invention with standard parts of the calculator omitted for the sake of simplicity.
Figure 2:
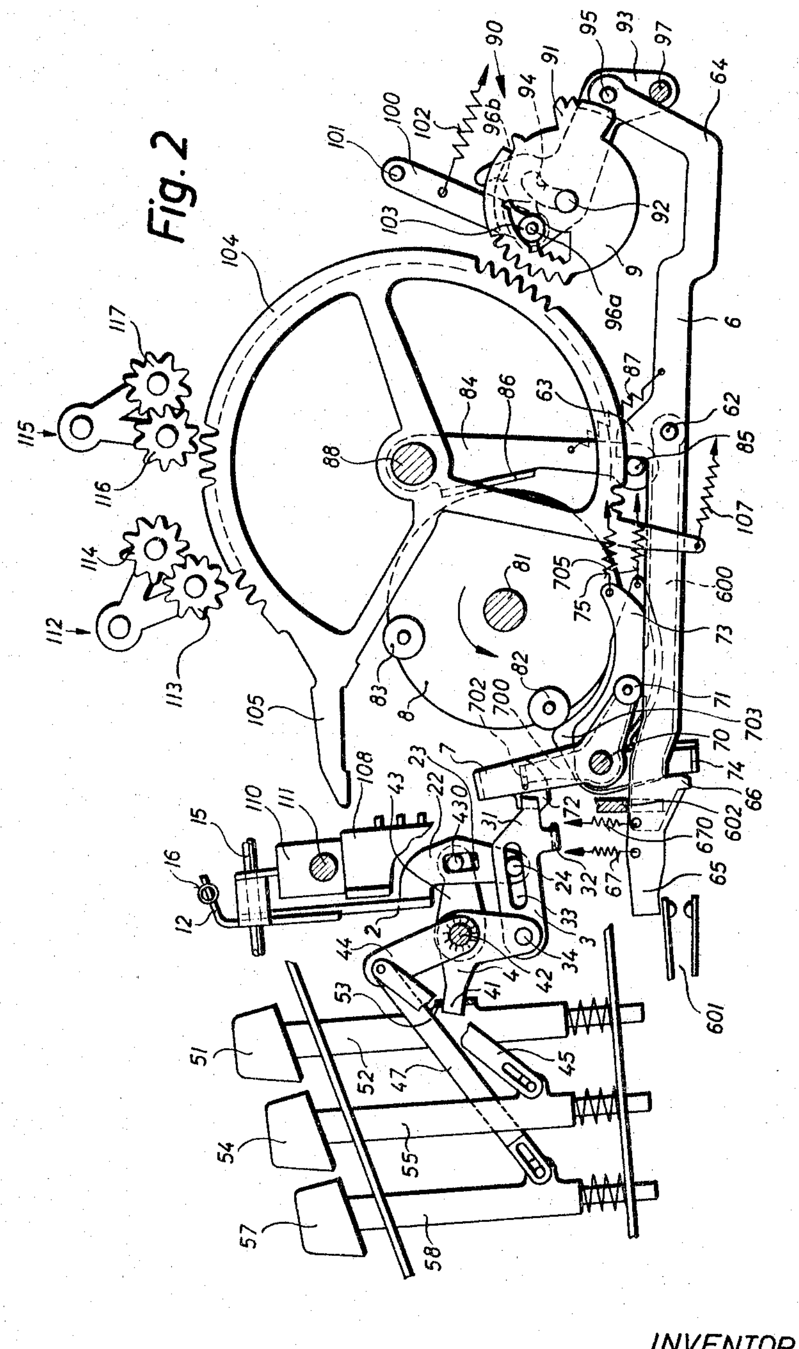
FIG. 2 is a vertical section of the embodiment of FIG. 1 illustrating the apparatus in an initial normal position.

Referring now to the drawings, and more particularly to FIGS. 1 and 2, the input storage device of the calculator is shown to be a pin carriage 108 provided with pins 109 mounted in parallel walls 108, and operable by the standard keys of a ten key calculator to store numerical values by displacement of pins 109. Whenever a digit is entered into the pin carriage, it performs one step to associate the input keys with a different row of pins 109 so that each row of pins 109 represents one order of a numerical value.

During a machine operation, which is started by operation of a function key in the usual manner, the standard operating means of the machine, which include a shaft 81 and a disc 8, are actuated to turn a set of ordinal transfer means 104 of which only one is shown in the drawings. A spring 107 is connected to the arm 106 of each transfer means 104 and biasses the same to turn in counterclockwise direction so that the respective order of the pin carriage 108 is sensed by the corresponding transfer means 104. After sensing, the angular position of each ordinal transfer means 104 represents the digit stored in the corresponding order of the pin carriage. Each transfer means 104 has an arcuate portion provided with gear teeth meshing with corresponding ordinal gears multiplication register 90. When the gears are in meshing engagement, the ordinal gears of the multiplication register are turned the same angle as the respective transfer means 104, and since the angular position of each transfer means 104 represents a digit, a corresponding digit is transferred between the multiplication register 90 and the transfer means 104.

Each ordinal gear of the multiplication register has a clearing projection 91 which is used in a well known manner to clear the multiplication register. The gears of the multiplication register are mounted on a shaft 92 which passes through a slot 94 in a shifting lever mounted on a shaft 97 for turning movement. Shifting lever 92 has arresting recesses **96*a* and 96*b* cooperating with a roller 103 for arresting shifting lever 93 in two angular positions in which the multiplication register 90 is in an inoperative position, and in a position meshing with transfer means 104, respectively. Arresting roller 103 is mounted at the end of an arresting lever 100 which is turnable about a shaft 101 against the action of a spring 102**.

Shifting lever 93 is connected by a pivot 95 to an arm 64 of a first coupling lever means 6 which is illustrated to be an elongated lever turnably supported on a movable pivot means 62. Coupling lever means 6 has a coupling projection 66, and an actuating projection 65 cooperating with a starting switch 601 and adapted to close the same. Starting switch 601 is connected into the circuit of the drive motor, not shown, of the calculator, and starts a machine operation, when closed. A spring 67 is secured to actuating projection 65 and biasses the first coupling lever means 6 to turn in clockwise direction about pivot means 62 to a position in which coupling projection 66 is located above a coupling projection 74 of a coupling lever 73 which is mounted for turning movement on a shaft 70. A spring 75 is connected to an arm of coupling lever 73 and holds the same in a position illustrated in FIG. 2 located below coupling projection 66.

A second coupling lever means 600 extends parallel to coupling lever means 6, and is also mounted on pivot means 62 for turning movement. The free end of coupling lever means 600 is connected with a spring 670 which urges coupling lever means 600 to turn in clockwise direction about pivot means 62. A stop means 602, see FIG. 2 limits movement of coupling lever means 6 and 600 under the action of springs 67 and 72 in the position shown in FIG. 2 in which a coupling projection 660 of coupling lever means 600 is located at the same level as coupling projection 66. Another angular coupling lever 703 is mounted on shaft 70 and has a transversely projecting coupling portion 704, shown in FIG. 4 and cooperating with coupling projection 660 in the same manner as coupling projection 66 of coupling lever means 6 cooperates with coupling projection 74 of coupling lever 73. A spring 705 acts on the end of one arm of coupling lever 703. A first control lever 7, and a second control lever 700 are also mounted on shaft 70 for turning movement. Control lever 7 has one arm carrying a roller 71 cooperating with the first coupling lever means 6, and another U-shaped arm ending in a coupling portion 72. The second control lever 700 has one arm provided with a roller 701, see FIG. 4, and another arm having a transverse coupling projection 702. Roller 701 cooperates with the second coupling lever means 600. Coupling levers 73 and 703 are mounted on shaft 70 between control levers 7 and 700.

Figure 4:
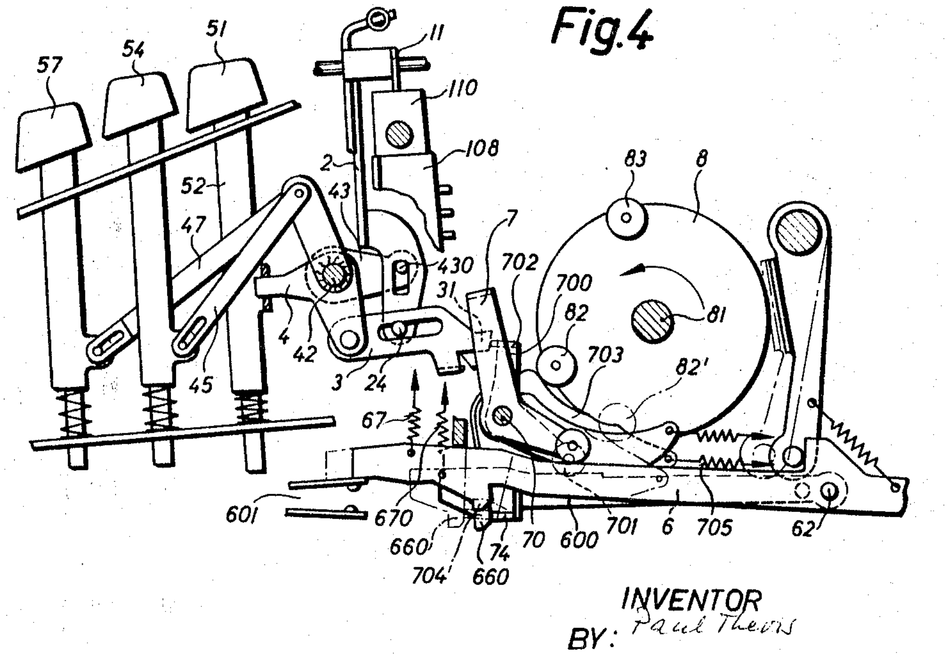
FIG. 4 is a fragmentary vertical sectional view corresponding to FIG. 3 and illustrating another operational position for transferring a value between the multiplication register and another register.

The operating shaft 81 extends parallel to shaft 70 and carries a disc 8 on which rotary rollers 82 and 83 are mounted circumferentially spaced from each other. Roller 82 cooperates with coupling lever 703 and with an engaging portion 86 of a return lever 84 which is mounted on shaft 88 for turning movement. Operating roller 83 is spaced from the surface of disc 8 in axial direction, and operating roller 82 is disposed closely adjacent to the surface of disc 8, so that roller 82 cannot engage projection 86 of return lever 84, but only coupling lever 703, as shown in FIG. 4. Roller 83 cannot only engage projection 86 of return lever 84, but also coupling lever 73 which is farther spaced from disc 8 than coupling lever 703.

The free end of return lever 84 carries a return pin 85 cooperating with a projection 63 of first coupling lever means 6. A spring 87 connects levers 84 and 6 to hold members 85, 63 in the illustrating abutting position.

Coupling projections 72 and 702 of control levers 7 and 700 cooperate with a coupling member 3 which has a coupling portion 31 cooperating with coupling portion 702 and another coupling portion 32 cooperating with coupling portion 72. Coupling member 3 is mounted for angular movement on a pin 34 of an angular lever 4 turnable on a shaft 42 which is mounted in a bearing of the frame of the machine. Lever 4 has a connecting tongue 41 located in a cutout of a projecting lug 53 on the stem 52 of a function key 51 shown to be the multiplication key of the calculator.

A lever 43 is secured to shaft 42 and carries a pin 430 located in a slot 23 on a portion 22 of a control member 2 whose remaining part is twisted out of the plane of portion 22 for constructive reasons. The lower end of control member 2, and more particularly of portion 22 carries a pin 24 located in an elongated slot 33 of coupling member 3.

The upper end of control member 3 carries a pin 21 located in a slot 14 at the end of a sensing member 1 which has a projecting arm 13 connected by a spring 17 to control member 3. Sensing member 1 is a double armed lever mounted for turning movement on a shaft 15. A spring 16 is secured to a projecting arm 12 of a sensing member 1 and urges the same to turn in clockwise direction to a position in which a sensing portion 11 rests on an abutment 110 secured to pin carriage 108 and mounted for sliding movement on a guide rod 111. In the home position of pin carriage 108, sensing projection 11 abuts abutment 110, but when pin carriage 108 moves to the left upon entry of a digital value, sensing portion 11 is no longer engaged by abutment 110 so that spring 16 turns sensing member 1 in clockwise direction to a position indicating that the pin carriage is no longer in the home position, but stores a numerical value.

Figure 3:
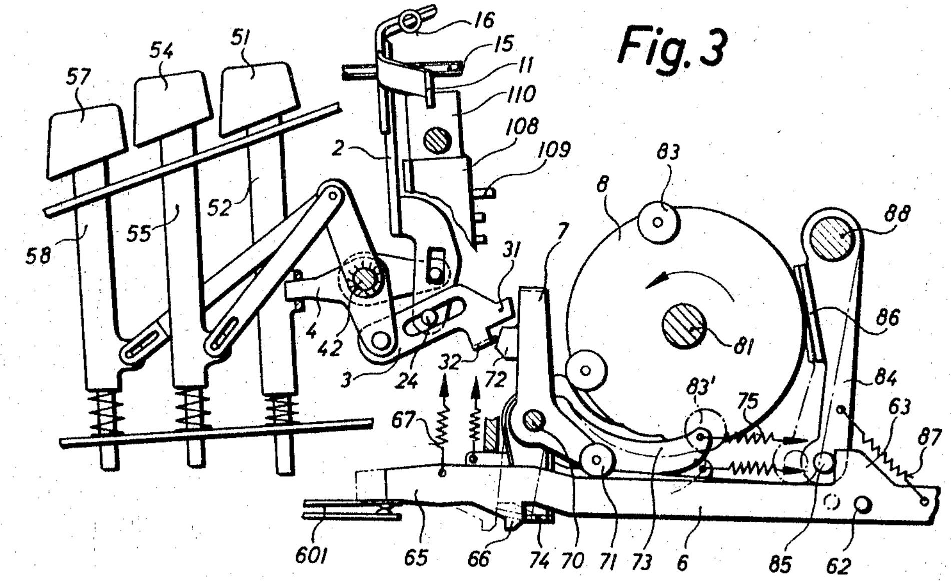
FIG. 3 is a fragmentary vertical sectional view illustrating the apparatus in a first operational position for transferring a numerical value from the pin carriage into a multiplication register.

When sensing projection engages abutment 110 in the home position of the pin carriage 108, control member 2 is in a lower position shown in FIGS. 1, 2 and 4 in which coupling projection 31 is located opposite coupling projection 702. When the pin carriage is displaced due to an entry therein, and sensing member 1 has been turned by spring 16, control member 2 is raised so that pin 24 raises coupling member 3 so that its coupling projection 31 is located opposite coupling projection 72 of control lever 7, as shown in FIG. 3. Due to the provision of slot 23 in portion 22, control member 2 can be raised without turning levers 43 and 4 which would cause displacement of multiplication key 51.

From the above description of the coupling device 3, 31, 32, 72, 702, it will become apparent that the coupling device is controlled by sensing means 11, 1, 2, 24 to move to a first coupling position coupled with control lever 7 when the pin carriage is in a storing position, and to move to a second coupling position coupled with control lever 700 when the pin carriage is in the home position.

When multiplication key 51 is depressed in the first coupling position, angular lever 4 turns and moves coupling member 3 in a translatory movement so that control lever 7 is turned in clockwise direction to the position shown in FIG. 3 in which roller 71 on control lever 7 has turned first coupling lever means 6 to a coupling position in which coupling portion 66 is located opposite coupling portion 74. Since the actuating projection 65 closes switch 601 in the coupling position of the first coupling lever means 6, the motor of the calculator is started, shaft 81 starts to rotate, and roller 83 is turned to a position 83' engaging coupling lever 73 and turning the same so that coupling portion 74 urges coupling portion 66 to the left as viewed in FIG. 3 to the position illustrated in chain lines.

If the multiplication key 51 is operated in the second coupling position of coupling member 3, which is the case when the pin carriage 108 is in the home position, angular lever 4 shifts coupling member 3 in a translatory movement so that coupling projection 31 engages coupling projection 702 and turns control lever 700 in clockwise direction to the position illustrated in FIG. 4 in which roller 701 turns the second coupling lever means 600 about pivot means 62 in counterclockwise direction so that coupling portion 660 is located opposite coupling projection 704 of coupling lever 703. However, since the second coupling lever means 600 is shorter than the first coupling lever means 6, and does not cooperate with starting switch 601, the motor of the calculator is not started by operation of multiplication key 51.

If the motor is started independently of the multiplication key, for example by operation of another function key, shaft 81 starts to rotate in counterclockwise direction as shown in FIG. 4 until roller 82 turns coupling lever 703 in clockwise direction so that coupling portion 704 engaging coupling portion 660 shifts the second coupling lever means 600 to the left as viewed in FIG. 4 to the position shown in broken lines.

Since coupling lever means 6 and 600 perform such translatory movement together due to the connection by pivot means 62, shifting lever 93 is operated and turns to a position in which multiplication register 90 is shifted to a position in which the teeth of its ordinal gears 9 mesh with the teeth of the ordinal transfer means 104. After further turning movement of disc 8 of the operating means, roller 83 engages projection 86 of return lever 84 and turns the same in counterclockwise direction as viewed in FIGS. 3 and 4 from the position illustrated in chain lines to the position illustrated in solid lines whereby the first and second coupling lever means 6, 600 are shifted and return to the initial positions shown in solid lines. Springs 75 and 705 return the coupling levers 73 and 703 to the initial position after the same are no longer engaged by rollers 83 and 82. Springs, 67 and 670 raise the first and second coupling lever means 6 and 600 to the initial position.

A lever 44 is fixedly secured to shaft 42 to which lever 43 carrying pin 430 is also fixed. Links 45 and 47 are pivotally connected with lever 44 and have slots 46 and 48, respectively, receiving pins 56, 59 secured to the stems 55 and 58 of a subtotal key 54 and of a total key 57. When either the total key or the subtotal key is operated, shaft 42 is angularly displaced in counterclockwise direction as viewed in FIG. 2 so that lever 43 is turned the same angle whereby control member 2 is raised and coupling member 3 is shifted from its second coupling position cooperating with control lever 700, 702 to its first coupling position cooperating with control lever 7, 72.

*Operations*

The first operation carried out by the apparatus is the normal function of the multiplication key. After a value, namely the multiplier, has been entered into the pin carriage 108, or corresponding input storage means, the multiplication key is actuated to start a machine operation. During the first half of the operational cycle, transfer means 104, 105, 107 sense the value stored in the pin carriage and assume corresponding angular positions, and during the second half of the operational cycle, the transfer means 104 transfer the numerical value into the multiplication register, which was cleared before this operation. Assuming that a numerical value has been stored in the pin carriage 108, so that the same is no longer in the home position and abutment 110 is displaced, sensing portion 11 of the sensing means 1, 2, 12, 16, 24, assumes the position shown in FIG. 3 since spring 16 turns sensing member 1 in clockwise direction so that control member 2 and pin 24 are raised, and the coupling member 3 of the coupling device 3, 31, 32, 72, 702 is shifted to the first coupling position in which projections 37 and 72 cooperate. When the multiplication key 51 is now depressed, angular lever 4 turns about shaft 42 and coupling member 3 is shifted so that coupling projections 32, 72 turn control lever 7 in clockwise direction whereby roller 71 moves the first coupling means 6 of the other coupling device 6, 66, 74, 73, 600, 660, 704, 703 to the first coupling position shown in FIG. 3 in which coupling projections 74, 66 cooperate, and in which starting switch 601 of the operating means 81, 8, 82, 83 is closed so that disc 8 starts to rotate. The first coupling means 6 turns about pivot means 62 against the action of spring 67.

During the first operational cycle of the machine which is started by closing of switch 601, transfer means 104 sense the set pins 109 of the pin carriage, while roller 83 of disc 8 arrives in the position 83' illustrated in chain lines in FIG. 3, and turns coupling lever 73 so that coupling portion 74 shifts the first coupling means 6 to the position shown in chain lines in FIG. 3, and the second coupling means 600 is shifted by pivot pin 62 to perform a corresponding movement which, however, has no effect.

However, the end portion 64 of the first coupling means 6 shifts shaft 92 of the multiplication register 90 to a position in which the teeth of the ordinal gears 9 are in meshing engagement with corresponding teeth of the ordinal transfer means 104.

During continuation of the operational cycle, the numerical value representing the multiplier stored in the transfer means 104 is transferred into the multiplication register 90 since the transfer means 104 turn through angles corresponding to the respective digits of the several orders of the numerical value, and turn the corresponding ordinal gears 9 corresponding angles. At the end of the cycle, roller 83 engages portion 86 of return lever 84 and turns the same from the position shown in chain lines in FIG. 3, assumed after the shifting of the first coupling means 6 by roller 83, back to the position shown in solid lines, causing shifting of the first coupling means 6 to the right as viewed in FIG. 3 to its initial position since pin 85 pushes projection 83 to the right.

The return of first coupling means 6 to the initial position causes a corresponding turning of shifting lever 93 and displacement of shaft 92 of the multiplication register 90 to a position in which the ordinal gears of the multiplication register 90 are again spaced from the corresponding ordinal transfer means 104. As explained above, the several springs of the apparatus return all displaced elements to the initial position.

The second operation of the apparatus of the invention is concerned with the transfer of a numerical value from the multiplication register into another register which is used for an addition or subtraction. During this operation, the pin carriage does not store a numerical value, but is in the home position. Operation of the multiplication key does not start an operational cycle, but connects the multiplication register with the transfer means. The operational cycle is started by actuation of an addition or subtraction key, for example, and during the first half of the operational cycle, the numerical value stored in the multiplication register and representing the multiplier is transferred to the transfer means, while during the second half of the operational cycle, this numerical value is either added, or subtracted in the other register while the multiplier is again transferred to the multiplication register, and stored in the same.

Consequently, this operation requires actuation of the multiplication key, as well as of another function key, such as the addition or subtraction key.

Since no value is stored in the pin carriage, the same is in the home position shown in FIG. 1, abutment 10 is engaged by sensing projection 11, and pin 24 holds coupling member 3 in a position in which projection 31 cooperates with coupling projection 702.

When the multiplication key 51 is depressed, angular lever 4 is turned and shifts coupling member 3 so that coupling portions 31 and 702 engage and control lever 700 is turned to the position shown in FIG. 4. Roller 701 of control lever 700 engages the upper edge of the second coupling means 600 and turns the same in counterclockwise direction about pivot means 62 so that coupling projection 660 is located opposite coupling projection 704 of coupling lever 703. Since the second coupling lever means 600 is shorter than the first coupling lever means 6, starting switch 601 is not closed, and the motor of the calculator and shaft 81 do not start to rotate. The first coupling lever means 6 remains in its initial inoperative position.

The addition key or the subtraction key is now depressed, which causes closing of switch 601, or of a corresponding start switch of the motor of the calculator, so that the operational cycle is started, and operating shaft 81 rotates with operating disc 8 in counterclockwise direction. When roller 82 arrives in position 82' illustrated in chain lines in FIG. 4, coupling lever 703 is turned and coupling projection 704 engages coupling projection 660 and shifts and the second coupling lever means 600 to the left as viewed in FIG. 4 to the position shown in chain lines. The first coupling lever means 6 is shifted the same distance by pivot means 62, so that portion 64 shifts shaft 95 of the multiplication register and places the latter in a position in which the ordinal gears 9 mesh with the ordinal transfer means 104. During the continuation of the operational cycle of the machine, transfer means 104 turn to angular positions representing the digits of the several orders, and during the second half of the machine cycle, the ordinal gears, for example 113 of the addition register 112, are turned corresponding angles to add the multiplier previously stored in multiplication register 9. The register 112 is placed in a position in which its ordinal gear mesh with corresponding gear portions of the ordinal transfer means 104, when the addition key is operated. The means for shifting register 112, or register 115, to this position, are well known, and consequently not illustrated [1].

Near the end of the second half of the operational cycle, roller 83 engages projection 86 of return lever 84 which shifts first coupling lever means 6, and thereby second coupling lever means 600 to the initial position which causes separation of the multiplication register from the transfer means 104. Before this operation, and while the transfer means 104 are still in meshing engagement with the multiplication register, the transfer means are turned to return the multiplier into the multiplication register.

A third operation of the apparatus is concerned with the transfer of a total, or subtotal from a register into the multiplication register. During this operation, no value is stored in the pin carriage, and the same is in the home position. The operation of the multiplication key does not start the operational cycle, but prepares the shifting means by the which the multiplication register is shifted for the following actuation by the operating means.

Since no value is stored in the pin carriage, the same is in the home position, and sensing portion 11 abuts abutment 110 of pin carriage 108. The sensing means 11, 1, 2, 24 holds coupling member 3 in the position cooperating with control lever 700, and when multiplication key 51 is operated, roller 701 engages the second coupling lever means 600 and turns the same down to the coupling position shown in FIG. 4 in which projections 660 and 704 cooperate. Since the first coupling lever means 6 is not turned, starting switch 601 remains open.

Either total key 57 or subtotal key 54 is now depressed so that linkage 45 or 47 turns lever 44 with shaft 42 and lever 43, raising control member 2 while pin 21 moves in slot 14 of sensing member 1 which is blocked due to the engagement of abutment 110 by sensing portion 11. Consequently, coupling member 3 assumes the coupling position in which coupling portion 32 cooperates with coupling portion 72 of lever 7 which is otherwise only obtained if the pin carriage is in a storing position. Control lever 700 is released by coupling member 3, and spring 660 raises coupling lever means 600 to a position in which it is no longer coupled with coupling portion 704 of coupling lever 703.

The effect of the actuation of the multiplication key, namely to place the shifting means of the multiplication register in a position for preparing the multiplication register to mesh during the first and second half of the operational cycle with the transfer means 104, is thus eliminated. The multiplication register is set to receive an entry, and must be connected to the transfer means 104 in cleared condition during the second half of the operational cycle.

Over coupling portion 72, control lever 7 is shifted to the position of FIG. 3 so that the first coupling lever means 6 is shifted to the coupling position in which coupling projections 66 and 74 cooperate so that coupling ever means 6 is shifted when roller 83 engages coupling lever 73 during the second half of the operational cycle. Roller 82 would have been effective during the first half of the cycle. The multiplication register is placed in meshing engagement with the transfer means 104 during the second half of the operational cycle.

In this manner, a subtotal or total is transferred from a register in a known manner into the multiplication register, and is available in the multiplication register for further calculations as a stored value, or as a repeated multiplier.

A fourth operation of the apparatus corresponds to the second operation, but instead of an addition or subtraction key, the non-addition key is operated. During the first half of the operational cycle, the multiplier value is taken from the multiplication register and transferred into the printing register, so that the value can be printed by printing means under control of the printing register during the second half of the operational cycle. At the same time, the multiplier value is again entered into the multiplication register.

An embodiment of the invention has been described in which the multiplication register is controlled by the multiplication key, and other standard function keys of the calculator. However, the construction of the invention may be applied to other registers, for example to registers of the type indicated at 112 and 115 which are arranged for carrying out additions and substractions.

It will be understood that each of the elements described above, or two or more together, may also find a useful application in other types of calculators differing from the types described above.

While the invention has been illustrated and described as embodied in an apparatus for transferring values between the multiplication register and other registers of a ten key calculator having a standard key board, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a calculator, in combination, input storage means movable between a home position and at least one storing position; sensing means for sensing the position of said input storage means; transfer means operable for sensing numbers stored in said input storage means; a register movable between a normal position and a transfer position connected with said transfer means for movement therewith so that numbers can be transferred between said transfer means and said register; driven operating means; means for starting said operating means; a function key; and connecting means controlled by said sensing means and operable by said function key for operating said starting means only if said input storage means is in said storing position, and for connecting said operating means with said register so that said operating means move said register to and from said transfer position.

[1] USA patent application Ser. No. 380,116 (Baldus et al.); USA Patent No. 2,665,844 (Westinger et al.).

2. In a calculator, in combination, input storage means movable between a home position and at least one storing position; sensing means for sensing the position of said input storage means; transfer means operable for sensing numbers stored in said input storage means; first and second registers, each register being movable between a normal position and a transfer position connected with said transfer means for movement therewith so that numbers can be transferred between said transfer means and said registers; driven operating means; means for starting said operating means; a first function key, such as an addition or subtraction key, connected to said starting means for operating the same and operatively connected with said first register for causing movement of the same to said transfer position; a second function key, such as a multiplication key; and connecting means controlled by said sensing means and operable by said second function key for operating said starting means only if said input storage means is in said storing position, and for connecting said operating means with said second register so that said operating means move said second register to and from said transfer position.

3. In a multiplying calculator, in combination, input storage means movable between a home position and at least one storing position for storing numbers; sensing means for sensing the position of said input storage means; transfer means operable for sensing a number stored in said input storage means; a register movable between a normal position and a transfer position connected with said transfer means so that numbers can be transferred between said transfer means and said register; driven operating means; means for starting said operating means; a first coupling device including first and second coupling means movable from a disengaged position to coupling positions for coupling said operating means with said register for moving the latter to and from said transfer position, said first coupling means in said coupling position thereof actuating said starting means to start said operating means; a function key; and a second coupling device having first and second coupling positions for coupling said function key with said first and second coupling means, respectively, for movement of the same by said function key to said coupling positions, respectively, so that said first coupling means actuates said starting means when said function key is operated in said first coupling position of said second coupling device, said second coupling device being settable for movement to said first or second coupling positions by said sensing means and assuming said first coupling position when said input storage means is in a storing position and said second coupling position when said input storage means is in said home position whereby the start of transfer operations between said register and said transfer means depends on the position of said input storage means.

4. In a multiplying calculator, in combination, input storage means movable between a home position and at least one storing position for storing numbers; sensing means for sensing the position of said input storage means; transfer means operable for sensing a number stored in said input storage means; first and second registers, each register being movable between a normal position and a transfer position connected with said transfer means so that numbers can be transferred between said transfer means and said registers; driven operating means; means for starting said operating means; a first coupling device including first and second coupling means movable from a disengaged position to coupling positions for coupling said operating means with said second register for moving the latter to and from said transfer position, said first coupling means in said coupling position thereof actuating said starting means to start said operating means; a first function key connected to said starting means for actuating the same and operatively connected with said first register for causing movement of the same to said transfer position; a second function key; and a second coupling device having first and second coupling positions for coupling said second function key with said first and second coupling means, respectively, for movement of the same by said second function key to said coupling positions, respectively, so that said first coupling means actuates said starting means when said second function key is operated in said first coupling position of said second coupling device, said second coupling device being settable for movement to said first or second coupling positions by said sensing means and assuming said first coupling position when said input storage means is in a storing position and said second coupling position when said input storage means is in said home position whereby the start of transfer operations between said second register and said transfer means depends on the position of said input storage means.

5. In a multiplying calculator, in combination, input storage means movable between a home position and at least one storing position for storing numbers; sensing means for sensing the position of said input storage means; transfer means operable for sensing a number stored in said input storage means; first and second registers, each register being movable between a normal position and a transfer position connected with said transfer means so that numbers can be transferred between said transfer means and said registers; driven operating means; means for starting said operating means; a first coupling device including first and second coupling means movable from a disengaged position to coupling positions for coupling said operating means with said second register for moving the latter to and from said transfer position, said first coupling means in said coupling position thereof actuating said starting means to start said operating means; a first function key connected to said starting means for actuating the same and operatively connected with said first register for causing movement of the same to said transfer position; a second function key; a second coupling device having first and second coupling positions for coupling said second function key with said first and second coupling means, respectively, for movement of the same by said second function key to said coupling positions, respectively, so that said first coupling means actuates said starting means when said second function key is operated in said first coupling position of said second coupling device, said second coupling device being settable for movement to said first or second coupling positions by said sensing means and assuming said first coupling position when said input storage means is in a storing position and said second coupling position when said input storage means is in said home position whereby the start of transfer operations between said second register and said transfer means depends on the position of said input storage means; and total key means operatively connected with said second coupling device for shifting the same from said second coupling position to said first coupling position.

6. In a calculator, in combination, input storage means movable between a home position and at least one storing position; sensing means for sensing the position of said input storage means; transfer means operable for sensing numbers stored in said input storage means; register means movable between a normal position and a transfer position connected with said transfer means for movement therewith so that numbers can be transferred between said transfer means and said register; driven operating means; function key means including a plurality of function keys for starting said operating means; and connecting means operable by said function key means for connecting said operating means with said register means so that said operating means move said register means to and from said transfer position, said connecting means including means controlled by said sensing means for disconnecting at least one function key from said operating means to prevent starting of said operating means by said one function key when said input storage means is in said home position; and total key means controlling said last-mentioned means and being operable to move said last-mentioned means to an inoperative position and to start said operating means to move said register means after a delay to said transfer position when said input storage means is in said home position.

7. In a multiplying calculator, in combination, input storage means movable between a home position and at least one storing position for storing numbers; sensing means for sensing the position of said input storage means; transfer means operable for sensing a number stored in said input storage means; first and second registers, said second register being a multiplication register movable between a normal position and a transfer position connected with said transfer means so that numbers can be transferred between said transfer means and said registers; driven operating means; switch means for starting said operating means; a first coupling device including first and second coupling means movable from a disengaged position to coupling positions for coupling said operating means with said second register for moving the latter to and from said transfer position, said first coupling means in said coupling position thereof actuating said starting switch means to start said operating means; a first function key being an addition or subtraction key, connected to said starting means for actuating the same and operatively connected with said first register for causing movement of the same to said transfer position; a second function key being a multiplication key; and a second coupling device having first and second coupling positions for coupling said second function key with said first and second coupling means, respectively, for movement of the same by said second function key to said coupling positions, respectively, so that said first coupling means actuates said starting means when said second function key is operated in said first coupling position of said second coupling device, said second coupling device being settable for movement to said first or second coupling positions by said sensing means and assuming said first coupling position when said input storage means is in a storing position and said second coupling position when said input storage means is in said home position whereby the start of transfer operations between said second register and said transfer means depends on the position of said input storage means.

8. In a multiplying calculator, in combination, input storage means movable between a home position and at least one storing position for storing numbers; sensing means for sensing the position of said input storage means; transfer means operable for sensing a number stored in said input storage means; first and second registers, said second register being a multiplication register movable between a normal position and a transfer position connected with said transfer means so that numbers can be transferred between said transfer means and said registers; driven operating means; switch means for starting said operating means; a first coupling device including first and second coupling means movable from a disengaged position to coupling positions for coupling said operating means with said second register for moving the latter to and from said transfer position, said first coupling means in said coupling position thereof actuating said starting switch means to start said operating means; a first function key being an addition or subtraction key, connected to said starting means for actuating the same and operatively connected with said first register for causing movement of the same to said transfer position; a second function key being a multiplication key; a second coupling device having first and second coupling positions for coupling said second function key with said first and second coupling means, respectively, for movement of the same by said second function key to said coupling positions, respectively, so that said first coupling means actuates said starting means when said second function key is operated in said first coupling position of said second coupling device, said second coupling device being settable for movement to said first or second coupling positions by said sensing means and assuming said first coupling position when said input storage means is in a storing position and said second coupling position when said input storage means is in said home position whereby the start of transfer operations between said second register and said transfer means depends on the position of said input storage means; and total key means operatively connected with said second coupling device for shifting the same from said second coupling position to said first coupling position.

9. In a calculator, in combination, input storage means movable between a home position and at least one storing position; sensing means for sensing the position of said input storage means; transfer means operable for sensing numbers stored in said input storage means; register means movable between a normal position and a transfer position connected with said transfer means for movement therewith so that numbers can be transferred between said transfer means and said register, said register means including a multiplication register; driven operating means; function key means including a plurality of function keys for starting said operating means; and connecting means operable by said function key means for connecting said operating means with said register means so that said operating means move said register means to and from said transfer position, said connecting means including means controlled by said sensing means for disconnecting at least one function key from said operating means to prevent starting of said operating means by said one function key when said input storage means is in said home position, said one function key being a multiplication key.

10. In a multiplying calculator, in combination, input storage means movable between a home position and at least one storing position for storing numbers; sensing means for sensing the position of said input storage means; transfer means operable for sensing a number stored in said input storage means; first and second registers, each register being movable between a normal position and a transfer position connected with said transfer means so that numbers can be transferred between said transfer means and said registers; driven operating means and including a rotary part having first and second angularly spaced operating members; means for starting said operating means; a first coupling device including first and second coupling means movable from a disengaged position to coupling positions for coupling said first and second operating members, respectively, with said second register for moving the latter to and from said transfer position during a first part, and during a second part of a revolution of said rotary part of said operating means, said first coupling means in said coupling position thereof actuating said starting means to start said operating means; a first function key, connected to said starting means for actuating the same and operatively connected with said first register for causing movement of the same to said transfer position; a second function key; a second coupling device having first and second coupling positions for coupling said second function key with said first and second coupling means, respectively, for movement of the same to said second function key to said coupling positions, respectively, so that said first coupling means actuates said starting means when said second function key is operated in said first coupling position of said second coupling device, said second coupling device being settable for movement to said first or second coupling positions by said sensing means and assuming said first coupling position when said input storage means is in a storing position and said second coupling position when said input storage means is in said home position whereby the start of transfer operations between said second register and said transfer means depends on the position of said input storage means.

11. In a multiplying calculator, in combination, a pin carriage movable between a home position and a plurality of storing positions for storing numbers; sensing means for sensing the position of said pin carriage; an ordinal set of transfer means operable for sensing a number stored in said pin carriage; first and second registers, each register being movable between a normal position and a transfer position connected with said transfer means for the transfer of numbers between said transfer means and said registers; rotary operating means including a rotary part having first and second angularly spaced operating members; switch means for starting said operating means; first and second coupling lever means; pivot means connecting said first and second coupling lever means for independent pivotal movement and for simultaneous translatory movement; first and second coupling levers respectively cooperating with said first and second coupling lever means and being respectively operable by said first and second operating members to shift the respective coupling lever means in said translatory movement if the respective coupling lever means is in a coupling position; first and second control levers for moving said first and second coupling lever means, respectively, to said coupling position; a coupling member shiftable between first and second positions respectively cooperating with said first and second control levers; a first function key connected with said coupling member for shifting the same and thereby said first or said second control lever, said sensing means being operatively connected with said coupling member for shifting the same to a position cooperating with said first control lever when said pin carriage is in said home position, and to a position cooperating with said second control lever when said pin carriage is in a storing position, each of said first and second coupling lever means being connected with said first register for moving the same to said transfer position when said first and second coupling lever means are shifted by said first and second operating members in said translatory movement during different parts of the operational cycle whereby the start of transfer operations between said first register and said transfer means depends on the position of the pin carriage; and a second function key controlling said second register and being connected with said operating means for starting the same.

12. An apparatus as set forth in claim 11 wherein said sensing means include a turntable sensing member for sensing the position of the pin carriage, spring means urging said sensing member to a sensing position, a control member connected with said coupling member for shifting the same between said first and second positions, and lost motion means connecting said control member with said sensing member; and including a total key operatively connected to said control member for shifting the same relative to said sensing member whereby said coupling member is shifted from said first position to said second position while said pin carriage is in said home position.

13. An apparatus as set forth in claim 12 wherein said coupling member has an elongated slot; and wherein said control member has a pin located in said slot so that said first function key can shift said coupling member without displacement of said control member.

14. An apparatus as set forth in claim 12 wherein said lost motion means includes a slot in said control member and a pin secured to said sensing member; said sensing means including spring means connecting said sensing member with said control member.

15. In an apparatus as set forth in claim 12 and including a shaft, means connecting said total key with said shaft so that the same is turned by operation of said total key, a lever secured to said shaft for turning movement and being connected with said control member for shifting the same relative to said sensing member when said total key is operated.

16. An apparatus as set forth in claim 11 wherein said coupling member has two coupling portions; and wherein said coupling levers have coupling portions respectively cooperating with said coupling portions of said coupling members in said first and second positions of said coupling member, and a roller on each of said control levers for engaging said first and second coupling lever means, respectively, and for turning the same to positions coupled with said first and second coupling levers.

17. An apparatus as set forth in claim 11 including a shaft supporting seaid first register, a shifting lever mounted for turning movement and connected with said shaft for shifting the same between a position in which said first register is spaced from said transfer means and said transfer position in which said first register is connected with said transfer means for rotation and transfer of values; and wherein said first coupling lever means is connected with said shifting lever for shifting the same when moving in a translatory movement under the control of said first or second operating member.

18. An apparatus as set forth in claim 11 wherein said operating members are rollers; and wherein each of said coupling levers has a cam face engaged by said rollers, respectively during a revolution of said rotary part of said operating means.

19. An apparatus as set forth in claim 11 and including a return lever connected with said first and second coupling lever means, said return lever having a portion located in the path of movement of the one of said operating members which trails in the direction of rotation of said rotary part so that at the end of the second part of the operational cycle said return lever is shifted by said trailing operating member and moves said first and second coupling lever means in a translatory movement to the initial position of the same whereby said first register is moved from said transfer position to a normal position spaced from said transfer means.

References Cited by the Examiner

UNITED STATES PATENTS

| | | | |
|---|---|---|---|
| 2,834,542 | 5/1958 | Sundstrand | 235—60 |
| 3,069,077 | 12/1962 | Rosati | 235—60 |
| 3,155,315 | 11/1964 | Giampiero et al. | 235—60 |

FOREIGN PATENTS

| | | |
|---|---|---|
| 850,815 | 11/1952 | Germany. |
| 756,772 | 9/1956 | Great Britain. |
| 510,383 | 1/1955 | Italy. |
| 118,240 | 2/1947 | Sweden. |

RICHARD B. WILKINSON, *Primary Examiner.*

S. A. WAL, *Assistant Examiner.*